United States Patent [19]

Omura et al.

[11] Patent Number: 4,505,714
[45] Date of Patent: Mar. 19, 1985

[54] PHTHALOCYANINE FIBER REACTIVE COMPOUND

[75] Inventors: Takashi Omura, Ashiya; Mikoto Takahashi, Toyonaka; Naoki Harada, Ibaraki; Akira Takeshita, Toyonaka, all of Japan

[73] Assignee: Sumitomo Chemical Company, Limited, Osaka, Japan

[21] Appl. No.: 579,546

[22] Filed: Feb. 13, 1984

[30] Foreign Application Priority Data

Feb. 17, 1983 [JP] Japan .................. 58-25986

[51] Int. Cl.$^3$ .................. C09B 47/03; C09B 62/51; D06P 1/38; D06P 3/66
[52] U.S. Cl. .................. 8/549; 8/436; 8/661; 8/686; 8/688; 8/917; 8/918; 8/924; 8/926; 260/242.2
[58] Field of Search .................. 260/242.2; 8/549, 661

[56] References Cited

U.S. PATENT DOCUMENTS 3,223,470 12/1965 Boedeker et al. .................. 8/548
4,330,469 5/1982 Gati et al. .................. 260/242.2
4,396,549 8/1983 Nakamatsu et al. .................. 260/242.2

FOREIGN PATENT DOCUMENTS 35171 9/1981 European Pat. Off. .
1118785 7/1968 United Kingdom .
2026527 2/1980 United Kingdom .
2034343 6/1980 United Kingdom .

*Primary Examiner*—A. Lionel Clingman
*Attorney, Agent, or Firm*—Stevens, Davis, Miller & Mosher

[57] ABSTRACT

A phthalocyanine compound which is represented by a free acid of the following formula,

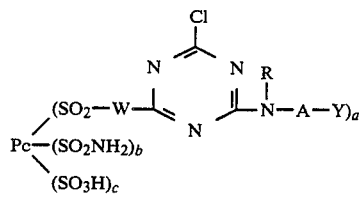

wherein Pc is a metal-free or metal-containing phthalocyanine residue, W is a group of

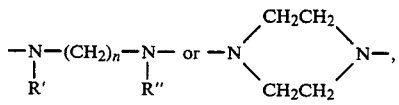

in which R' and R'' are independently a hydrogen atom or a methyl or ethyl group, and n is an integer of from 2 to 6, R is an unsubstituted or substituted lower alkyl group, A is an unsubstituted or substituted phenylene or naphthylene group, Y is a group of —SO$_2$CH=CH$_2$ or —SO$_2$CH$_2$CH$_2$Z in which Z is a group capable of being split by the action of an alkali, a is a positive number of from 1 to 3, and b and c are independently a positive number of from 0 to 3, provided that a, b and c statisfy $0 < a+b+c \leq 4$, and which is useful for dyeing or printing fiber materials, particularly cellulose fiber materials, to give a dyed or printed product of a brilliant turquoise blue color excellent in various fastness, particularly light fastness and wet fastness.

8 Claims, No Drawings

PHTHALOCYANINE FIBER REACTIVE COMPOUND

The present invention relates to a phthalocyanine compound, a method for producing the same and a method for dyeing fiber materials by using the same.

More specifically, the present invention relates to a phthalocyanine compound having two fiber-reactive groups, a method for producing the same and a method for dyeing fiber materials in a turquoise blue color by using the same as a fiber-reactive dye.

Reactive phthalocyanine dyes having a monohalogenotriazinyl group, a sulfatoethylsulfonyl group or the like as a fiber-reactive group are known. Recently, reactive dyes of this type having both sulfatoethylsulfonyl group and monochlorotriazinyl group have been developed to improve the dye performances. However, these reactive dyes are still insufficient in their dye performances such as fixing efficiency, dyeing velocity, washing-off property, low-temperature dyeability, level dyeing property, solubility, fastness or the like.

For example, Pubilished Examined Japanese Patent Application No. 18184/1964 discloses a dye of the following formula (A),

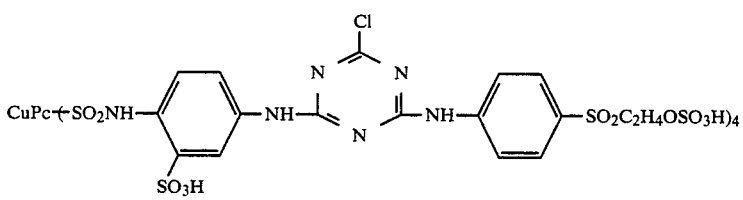

wherein CuPc is copper phthalocyanine residue, which is unsatisfactory in fixing efficiency, washing-off property and low-temperature dyeability.

U.S. Pat. No. 4,396,549 discloses a dye of the following formula (B),

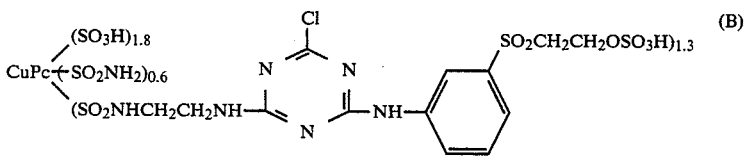

wherein CuPc is as defined above, which is insufficient in the fixing efficiency, dyeing velocity and solubility (particularly when the sulfatoethylsulfonyl group is converted to vinylsulfonyl group by the action of alkali).

The present inventors have undertaken extensive studies in order to solve the above problems in the phthalocyanine reactive dyes having aforesaid both reactive groups, and found the fact that the linking group between the monohalogenotriazinyl group and the aromatic group to which the sulfatoethylsulfonyl group is appended decisively affects various dye performances, and that the problems described above can be solved by selecting a suitable linking group.

The present invention provides a phthalocyanine compound represented by a free acid of the following formula (I),

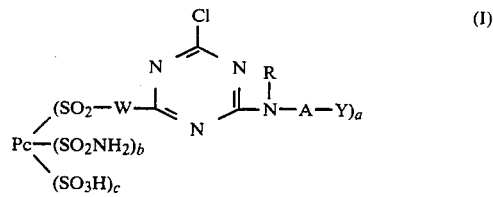

wherein Pc is a metal-free or metal-containing phthalocyanine residue, W is a group of

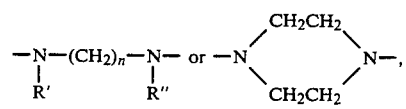

in which R' and R" are independently a hydrogen atom or a methyl or ethyl group, and n is an integer of from 2 to 6, R is an unsubstituted or substituted lower alkyl group, A is an unsubstituted or substituted phenylene or naphthylene group, Y is a group of $-SO_2CH=CH_2$ or $-SO_2CH_2CH_2Z$ in which Z is a group capable of being split by the action of an alkali, a is a positive number of from 1 to 3, and b and c are independently a positive number of from 0 to 3, provided that a, b and c satisfy $0 < a+b+c \leq 4$, and a method for producing the phthalocyanine compound of the above formula (I), which comprises (1) reacting a phthalocyanine sulfochloride with a diamine compound selected from piperazine and alkylenediamines of the following formula (II), $$HN-(CH_2)_n-NH$$
$$\phantom{HN-(CH_2)}|\phantom{_n-}|$$
$$\phantom{HN-(CH_2)_n-}R'\phantom{HH}R''$$

(II)

wherein R', R" and n are as defined above, in the presence or absence of ammonia, to obtain a compound of the following formula (III),

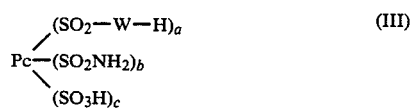

wherein Pc, W, a, b, and c are as defined above, and then reacting cyanuric chloride with the compound of the formula (III) and an aromatic amine of the following formula (IV),

 (IV)

wherein R, A and Y are as defined above, in an optional order, or (2) reacting cyanuric chloride with the diamine compound as defined above and the aromatic amine of the formula (IV) in an optional order to obtain a triazine compound of the following formula (V),

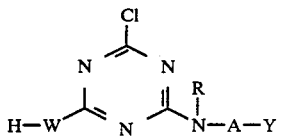 (V)

wherein W, R, A and Y are as defined above, and then reacting the triazine compound of the formula (V) with a phthalocyanine sulfochloride in the presence or absence of ammonia.

The present invention also provides a method for dyeing fiber materials, which comprises contacting the fiber materials with the phthalocyanine compound of the formula (I).

In the present invention, a preferable phthalocyanine residue among those represented by Pc in the formula (I) contains a metal. Particularly preferred are copper phthalocyanine residue and nickel phthalocyanine residue.

Among the groups of

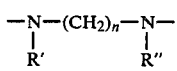

represented by W, preferred is a group of —NH—(CH$_2$)$_n$—NH—, wherein n is an integer of 2 to 6, preferably 2, 3 or 6.

The lower alkyl group represented by R includes C$_1$ to C$_4$ alkyl groups unsubstituted or substituted with a hydroxyl, cyano, alkoxy, carboxy, carbamoyl, alkoxycarbonyl, alkylcarbonyloxy, sulfo or sulfamoyl group or a halogen atom. Of these, preferred are methyl, ethyl, n- or isopropyl, 2-carboxyethyl, 2-carbamoylethyl, 2-hydroxyethyl and 2-sulfoethyl groups.

The phenylene group represented by A includes a phenylene group unsubstituted or substituted with one or two members selected from chlorine, bromine, methyl, ethyl, methoxy, ethoxy and sulfo, and the naphthalene group represented by A includes a naphthalene group unsubstituted or substituted with one sulfo group. Examples thereof are as follows.

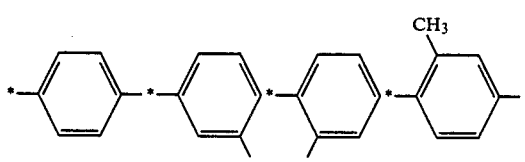

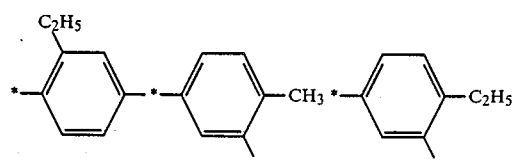

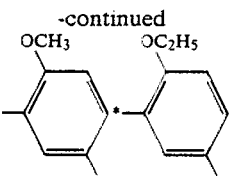

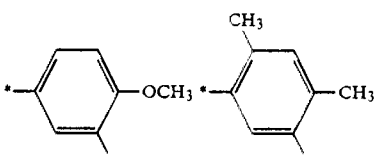

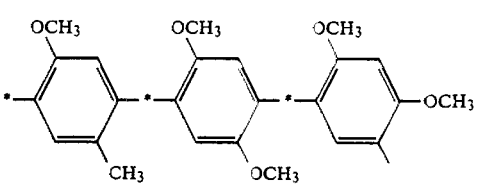

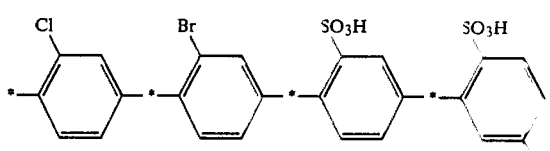

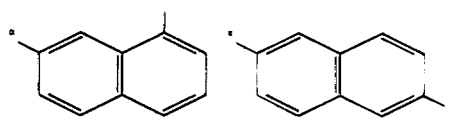

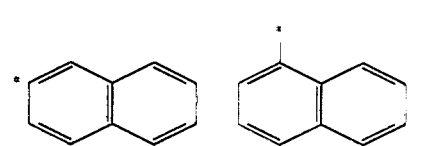

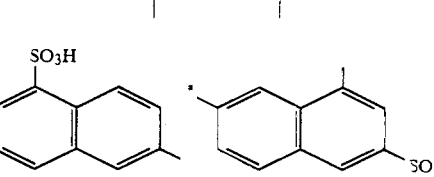

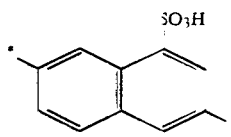

(In the above formulas, the asterisked linkage is bonded to the group,

Of these, preferred are phenylene groups, particularly unsubstituted phenylene groups.

Examples of the group capable of being splitted by the action of an alkali represented by Z are a sulfuric acid ester, phosphoric acid ester or acetic acid ester group or a halogen atom. Of these, a sulfuric acid ester is preferable, and thus preferred Y is —SO$_2$CH$_2$CH$_2$OSO$_3$H.

The phthalocyanine compound (I) of the present invention may be a single compound, in other words, a, b and c in the formula (I) are independently an integer within the range as defined above, or usually a mixture of two or more, in other words, a, b and c are independently an average number.

The present compound (I) may be in the form of a free acid or a salt, such as alkali metal or alkaline earth metal salt. Preferred are sodium, potassium and calcium salts.

The salt of the phthalocyanine compound (I) can be formed as desired by selecting the kind of the starting compounds, alkali agents usable for neutralization of the acid during the phthalocyanine compound production steps, or electrolytes to be used when the desired compound is, if desired, isolated by salting-out.

Among the phthalocyanine compounds (I), preferred is a compound of the following formula,

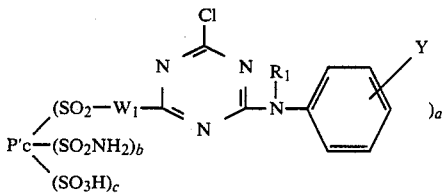

wherein Y, a, b and c are as defined above, P'c is a nickel or copper phthalocyanine residue, $W_1$ is a group of $-NH-(CH_2)_n-NH-$, in which n is an integer of from 2 to 6, or

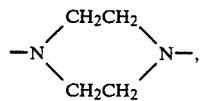

and $R_1$ is a methyl, ethyl, n- or iso-propyl, 2-carboxyethyl, 2-carbamoylethyl, 2-hydroxyethyl or 2-sulfoethyl group.

The phthalocyanine compound (I) can be produced in the following manner.

A phthalocyanine sulfochloride is thoroughly suspended in an aqueous medium, and then a diamine compound selected from piperazine and the alkylenediamines of the formula (II) is added thereto, if desired together with ammonia. The mixture is allowed to react at a temperature of −10° to 40° C., while keeping the pH within a range of between 4 and 12, thereby obtaining the compound of the formula (III).

The compound (III) and the aromatic amine of the formula (IV) can be subjected to condensation with cyanuric chloride in an optional order to obtain the desired phthalocyanine compound (I).

Alternatively, a diamine compound selected from piperazine and the alkylenediamines (II), and the aromatic amine (IV) can be subjected to condensation with cyanuric chloride in an optional order to obtain the monochlorotriazine compound of the formula (V).

The resulting monochlorotriazine compound (V) is then subjected to condensation with a phthalocyanine sulfochloride in the presence or absence of ammonia. The condensation can be carried out in an aqueous medium at a temperature ranging from 0° to 40° C. and at a pH ranging from 3 to 9, whereby the desired phthalocyanine compound (I) can be obtained.

Although the order of both condensations between cyanuric chloride and any of the compound (III) and the aromatic amine (IV), and between cyanuric chloride and any of the diamine compound and the aromatic amine compound (IV) is not particularly limited, it is preferred to carry out the first condensation using any of them, which has a lower reactivity with cyanuric chloride than the other has, followed by the second condensation with the remaining one. The reaction conditions for both condensations are not particularly limited. However, the first condensation may be preferably carried out in an aqueous medium at a temperature ranging from −10° to 40° C. and at a pH ranging from 2 to 9, and the second condensation may be preferably carried out in an aqueous medium at a temperature ranging from 0° to 70° C. while keeping the pH within a range of from 2 to 9.

In the phthalocyanine compound of the formula (I), each degree of a, b and c can be determined as desired by selecting the sulfonation degree of phthalocyanine sulfochloride and amounts to be used of the diamine compound, the monochlorotriazine compound (V) and/or ammonia.

Examples of the alkylenediamines (II) are ethylenediamine, N-methylethylenediamine, N,N'-dimethylethylenediamine, N,N'-diethylethylenediamine, propylenediamine, N-methylpropylenediamine, N,N'-dimethylpropylenediamine, butylenediamine, pentylenediamine and hexylenediamine.

The aromatic amine of the formula (IV) can be prepared by reacting a primary aromatic amine of the formula (VI),

$$H_2N-A-Y \qquad (VI)$$

wherein A and Y are as defined above, with an alkylating agent, or reacting a precursor compound of the formula (VII),

$$H_2N-A-SO_2CH_2CH_2OH \qquad (VII)$$

wherein A is as defined above, with an alkylating agent, followed by esterification or halogenation in a conventional manner.

Examples of the alkylating agent are alkyl halides, dialkylsulfuric acid, monosubstituted ethylenes and oxides.

Examples of the primary aromatic amine compounds (VI) are as follows:

1-Aminobenzene-2,3- or 4-β-sulfatoethylsulfone
1-Aminobenzene-3-phosphatoethylsulfone
1-Amino-4-methylbenzene-3-β-sulfatoethylsulfone
1-Aminobenzene-3-β-chloroethylsulfone
1-Amino-4-methoxybenzene-3-β-sulfatoethylsulfone
1-Amino-2,5-dimethoxybenzene-4-β-sulfatoethylsulfone
1-Amino-2-methoxybenzene-4-β-sulfatoethylsulfone
1-Amino-2-chlorobenzene-4-β-sulfatoethylsulfone
1-Amino-2-methoxybenzene-5-β-sulfatoethylsulfone
2-Aminonaphthalene-8-β-sulfatoethylsulfone
2-Aminonaphthalene-8-β-sulfatoethylsulfone-6-sulfonic acid
1-Amino-2,5-dimethoxybenzene-4-vinylsulfone
1-Amino-2-methoxy-5-methylbenzene-4-β-sulfatoethylsulfone
2-Aminonaphthalene-4, 5-, 6- or 7-β-sulfatoethylsulfone
1-Amino-2-bromobenzene-4-β-sulfatoethylsulfone
1-Amino-2-bromobenzene-4-vinylsulfone 2-Amino-8-sulfonaphthalene-6-β-sulfatoethylsulfone
2-Aminonaphthalene-8-β-phosphatoethylsulfone-6-sulfonic acid
2-Aminonaphthalene-8-vinylsulfone-6-sulfonic acid
1-Amino-2-methoxy-5-methylbenzene-5-β-chloroethylsulfone
1-Aminobenzene-2-, 3- or 4-vinylsulfone
1-Amino-2-methoxy-5-chlorobenzene-4-β-sulfatoethylsulfone or -4-vinylsulfone
1-Amino-2-ethoxy-5-chlorobenzene-4-β-sulfatoethylsulfone or -4-vinylsulfone
2-Aminonaphthalene-6-β-sulfatoethylsulfone-1-sulfonic acid
5-Chloroaniline-2-β-sulfatoethylsulfone
5-Sulfoaniline-2-β-sulfatoethylsulfone
Aniline-2-β-thiosulfatoethylsulfone
5-Chloroaniline-2-β-thiosulfatoethylsulfone
5-Sulfoaniline-2-β-thiosulfatoethylsulfone
Aniline-2-β-phosphatoethylsulfone
5-Chloroaniline-2-β-phosphatoethylsulfone
5-Sulfoaniline-2-β-phosphatoethylsulfone
5-Chloroaniline-2-vinylsulfone
5-Sulfoaniline-2-vinylsulfone
Aniline-2-β-chloroethylsulfone
5-Chloroaniline-2-β-chloroethylsulfone
5-Sulfoaniline-2-β-chloroethylsulfone All the starting compounds described above may be used in the form of acid or salts, particularly alkali metal salts or alkaline earth metal salts.

The phthalocyanine compound (I) produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The phthalocyanine compound (I) having two kinds of fiber reactive groups may be used as a reactive dye for dyeing hydroxyl group-, or amido group-containing materials.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive groups appended to the fiberreactive dye.

For example, in the case of dyeing cellulose fiber materials, the dyeing may be carried out by an exhaustion dyeing, printing, padding including cold-pad-batch-up method or the like, from which a suitable one may be chosen depending on the property and physical form of the fibers. In these methods, an acid-binding agent such as sodium hydroxide, sodium carbonate, sodium bicarbonate, phosphates, silicates and the like may be used together with the phthalocyanine compound (I).

More concretely speaking, the exhaustion dyeing may be carried out at a relatively low temperature using a dye bath containing sodium hydroxide or other acid-binding agents, and sodium sulfate or sodium chloride. The printing may be carried out by preparing a dye paste containing a paste or emulsified paste such as sodium alginate and starch ether, alkalis or alkali-liberating agents such as sodium carbonate, sodium bicarbonate, sodium hydroxide, trisodium phosphate, sodium trichloroacetate and the corresponding potassium or alkaline earth metal salts, and if desired, a conventional printing assistant such as urea, and a dispersing agent, applying the dye paste on the fiber, drying and then heat-treating the printed fiber using steam. The cold-pad-batch-up method may be carried out by applying a padding solution to the fiber at ambient temperature, the padding solution comprising an acid-binding agent such as sodium hydroxide alone or a mixture of sodium hydroxide and sodium silicate, sodium carbonate or trisodium phosphate, and if necessary, a dissolving assistant such as urea, and a penetrant, batching up the fiber with a roll, allowing to stand for 3 hours or more, or overnight, and then rinsing and drying to obtain a dyed product.

The phthalocyanine compound (I) of the present invention can give remarkable advantages in the dyeing of fiber materials. Particularly when used for dyeing cellulose fiber materials, the present compounds can exhibit excellent build-up and level-dyeing properties and give a dyed product excellent in light fastness, perspiration-light fastness, abrasion fastness, wet fastness such as washing resistance, alkali resistance, perspiration resistance and peroxide-washing resistance, acid-hydrolysis fastness and iron fastness.

Furthermore, the phthalocyanine compound (I) can give a dyed product constant in the quality irrespective of change in the dyeing temperature, and exhibit high exhaustion and fixation percentages, and improved solubility in water or alkali-containing water.

The present invention is illustrated in more detail with reference to the following Examples which are only illustrative for the present invention. In Examples, parts are by weight, and CuPc and NiPc are intended to mean unsubstituted copper and nickel phthalocyanine residues, respectively.

EXAMPLE 1

Copper phthalocyanine-sulfonic acid-trisulfochloride (95 parts) in the form of wet cake was thoroughly suspended in ice water (500 parts), and then ethylenediamine (9 parts) and concentrated aqueous ammonia (6 parts) were added thereto. The mixture was gradually heated and stirred at 30° C. for 15 hours, during which a 28% aqueous sodium hydroxide solution was added for keeping the pH within a range of 10 to 11. Stirring was further continued at 70° C. for 3 hours. The reaction mixture was then cooled to 5° C. and neutralized so as to adjust the pH to between 7 and 8 by adding hydrochloric acid. Successively, cyanuric chloride (28 parts) was added to the reaction mixture kept at 5° C., and the resulting mixture was stirred at a temperature of between 5° and 10° C. for 2 hours, during which the pH was controlled within a range of 7 to 8 by adding a 20% aqueous sodium carbonate solution. Then, 1-N-ethylaminobenzene-3-β-sulfatoethylsulfone (47 parts) was added thereto, and the mixture was stirred at 40° C.

for 20 hours, during which the pH was controlled within a range of 5 to 6 by adding a 20% aqueous sodium carbonate solution. Sodium chloride was added to the reaction mixture to deposit crystals, which were then collected on a suction filter, washed with a 20% sodium chloride solution and dried at 60° C., thereby obtaining a phthalocyanine compound of the following formula.

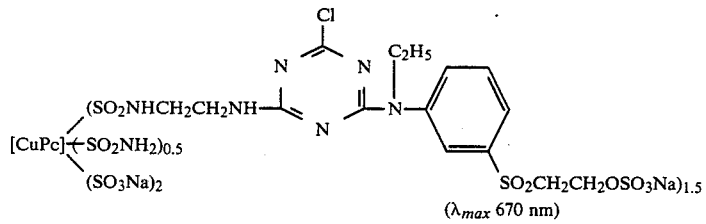

($\lambda_{max}$ 670 nm)

This compound is easily soluble in water to show a blue color, and useful as a fiber-reactive dye to give a dyed or printed product of brilliant turquoise blue color excellent in light fastness, wet fastness such as washing resistance, acid-hydrolysis fastness and alkali fastness.

EXAMPLE 2

Cyanuric chloride (74 parts) was suspended in ice water (500 parts), and a solution prepared by dissolving 1-N-ethylaminobenzene-4-β-sulfatoethylsulfone (62 parts) in water (500 parts) was dropwise added thereto. The mixture was stirred at 10° C. for 2 hours, during which the pH was controlled within a range of 5 to 6 by using a 20% aqueous sodium carbonate solution. Successively, 1,3-propylenediamine (19 parts) was added thereto, and the mixture was stirred at 25° C. for 5 hours, during which the pH was controlled within a range of 5 to 6 by using a 20% aqueous sodium carbonate solution. To this reaction mixture was added copper phthalocyanine-disulfonic acid-disulfochloride (186 parts) in the form of wet cake, and the mixture was stirred at 30° C. for 8 hours, during which the pH was controlled within a range of 5 and 6 by using a 20% aqueous sodium carbonate solution. Sodium chloride was added to the reaction mixture to deposit crystals, which were then collected on a suction filter, washed with a 10% aqueous sodium chloride solution, and then spray-dried to obtain a phthalocyanine compound of the following formula.

This compound is easily soluble in water to show a blue color, and useful as a fiber-reactive dye to give a dyed or printed product of brilliant turquoise blue color having excellent dyeing properties similar to those in Example 1.

EXAMPLE 3

Copper phthalocyanine-tetrasulfochloride (48.5 parts) in the form of wet cake was thoroughly suspended in ice water (250 parts), and piperazine (8.6 parts) and concentrated aqueous ammonia (6 parts) were added thereto. The mixture was gradually heated and stirred at 30° C. for 15 hours, during which the pH was controlled within a range of 10 to 11 by using a 28% sodium hydroxide solution. Stirring was continued at 70° C. for 3 hours. The reaction mixture was allowed to cool to 20° C., and adjusted to pH of between 4 and 6 by the addition of hydrochloric acid. The crystals precipitated were collected on a suction filter to obtain a wet cake.

Cyanuric chloride (19.5 parts) was suspended in ice water (100 parts), and a solution prepared by dissolving 1-N-carboxyethylaminobenzene-4-β-sulfatoethylsulfone (34.3 parts) in water (100 parts) was dropwise added thereto. The mixture was stirred at 5° C. for 3 hours, during which the pH was controlled within a range of 5 to 6 by using a 20% aqueous sodium carbonate solution. To the reaction mixture was added an aqueous suspension prepared from the above wet cake and water (300 parts), and the resulting mixture was stirred at 30° C. for 15 hours, during which the pH was controlled within a range of 5 to 6 by using a 20% aqueous sodium carbonate solution. Potassium chloride was added to the reaction mixture to deposit crystals, which were then collected on a suction filter, washed with a 10% potassium chloride solution and then dried at 60° C. to obtain a phthalocyanine compound of the following formula.

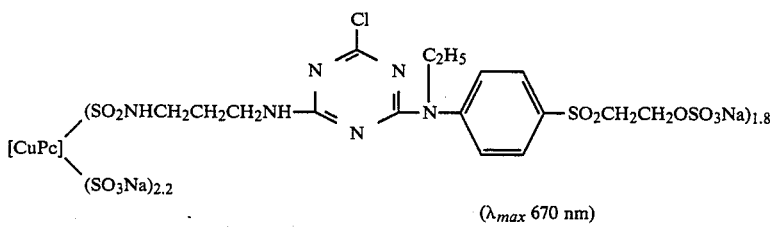

($\lambda_{max}$ 670 nm)

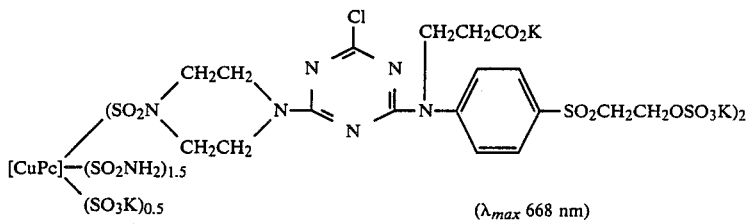

($\lambda_{max}$ 668 nm)

This compound is easily soluble in water to show a blue color, and useful as a fiber-reactive dye to give a dyed or printed product of brilliant turquoise blue color having excellent dyeing properties similar to those in Example 1.

EXAMPLES 4 to 73

In a manner similar to that of any of Examples 1 to 3, it is able to obtain each phthalocyanine compound having the following formula (VIII), wherein W, R, A-Y, a, b, and c are as shown in the following Table, provided that the sulfonation degree of copper phthalocyanine sulfochloride, the kind and amount of diamine compound, the amount of concentrated aqueous ammonia and the kind of aromatic amine of the aforesaid formula (IV) are changed corresponding to each compound as shown in Table.

TABLE

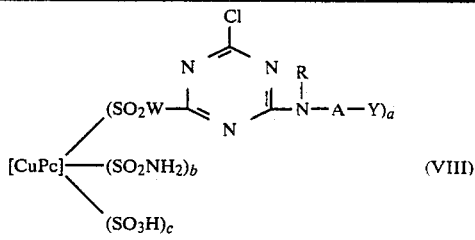

(VIII)

| Exp. No. | —W— | —R | —A—Y | a | b | c | Shade |
|---|---|---|---|---|---|---|---|
| 4 | —N(CH₂)₂N—<br>H    H | —CH₃ | ⌬—SO₂CH₂CH₂OSO₃H | 1.5 | 0.5 | 2 | Turquoise blue |
| 5 | " | —CH₂CN | " | " | " | " | " |
| 6 | " | —CH₂CONH₂ | " | " | " | " | " |
| 7 | " | —CH₂CO₂H | " | 2 | 0 | 2 | " |
| 8 | " | —CH₂CH₃ | " | " | " | " | " |
| 9 | " | —CH₂CH₂OH | " | " | " | " | " |
| 10 | " | —CH₂CH₂OCH₃ | " | " | " | " | " |
| 11 | " | —CH₂CH₂CN | " | 1.5 | 0.5 | 2 | " |
| 12 | " | —CH₂CH₂CONH₂ | " | " | " | " | " |
| 13 | " | —CH₂CH₂CO₂H | " | 2 | 0 | 1 | " |
| 14 | " | —CH₂CH₂SO₃H | " | " | " | " | " |
| 15 | " | —CH₂CH₂SO₂NH₂ | " | " | " | " | " |
| 16 | " | —CH₂CH₂CH₃ | " | 1.5 | 0.5 | 2 | " |
| 17 | " | —CH₂CH₂CH₂OH | " | " | " | " | " |
| 18 | " | —CH₂CHCH₃<br>       \|<br>      OH | " | " | " | " | " |
| 19 | " | —CH(CH₃)₂ | " | " | " | " | " |
| 20 | " | —CH₂CH₂CH₂CH₃ | " | 2 | 0 | 2 | " |
| 21 | " | —CH₂CHCH₂CH₃<br>       \|<br>      OH | " | " | " | " | " |
| 22 | —N(CH₂)₃N—<br>N    H | CH₃ | " | 1.5 | 0.5 | 2 | " |
| 23 | " | —CH₂CN | " | " | " | " | " |
| 24 | " | —CH₂CO₂H | " | 1.8 | 0 | 2.2 | " |
| 25 | " | —CH₂CH₂CN | " | " | 1 | 2 | " |
| 26 | " | —CH₂CH₂CONH₂ | " | " | " | " | " |
| 27 | " | —CH₂CH₂CO₂H | " | 1.8 | 0 | 2.2 | " |
| 29 | " | —CH₂CH₂OH | " | " | " | " | " |
| 30 | " | —CH₂CH₂SO₃H | " | " | " | " | " |
| 31 | " | —CH₂CH₂CH₃ | " | 1.5 | 0.5 | 2 | " |
| 32 | —N(CH₂)₄N—<br>H    H | —CH₃ | " | " | " | " | " |

TABLE-continued

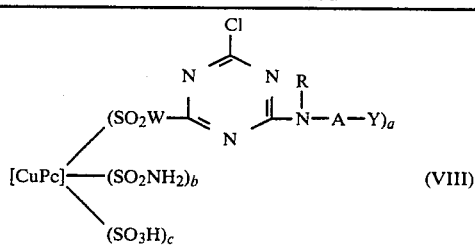

(VIII)

| Exp. No. | —W— | —R | —A—Y | a | b | c | Shade |
|---|---|---|---|---|---|---|---|
| 33 | " | —CH$_2$CH$_3$ | " | " | " | " | " |
| 34 | —N(CH$_2$)$_5$N—<br>H    H | —CH$_3$ | " | " | " | " | " |
| 35 | " | —CH$_2$CH$_3$ | " | " | " | " | " |
| 36 | —N(CH$_2$)$_6$N—<br>H    H | —CH$_3$ | " | " | " | " | " |
| 37 | " | —CH$_2$CH$_3$ | " | " | " | " | " |
| 38 | " | —CH$_2$CH$_2$CO$_2$H | " | 2 | 0 | 1 | " |
| 39 | —N(CH$_2$)$_2$N—<br>CH$_3$   CH$_3$ | —CH$_2$CH$_3$ | " | 1 | 0 | 3 | " |
| 40 | —N(CH$_2$CH$_2$)$_2$N— (piperazine) | —CH$_2$CH$_3$ | " | " | " | " | " |
| 41 | —N(CH$_2$)$_2$N—<br>H    H | —CH$_3$ | ⟨C$_6$H$_4$⟩SO$_2$CH$_2$CH$_2$OSO$_3$H | 1.5 | 0.5 | 2 | " |
| 42 | " | —CH$_2$CN | " | " | " | " | " |
| 43 | " | —CH$_2$CO$_2$H | " | 2 | 0 | 2 | " |
| 44 | " | —CH$_2$CH$_2$OH | " | 1 | 1 | 2 | " |
| 45 | " | —CH$_2$CH$_2$CN | " | " | " | " | " |
| 46 | " | —CH$_2$CH$_2$CONH$_2$ | " | " | " | " | " |
| 47 | " | —CH$_2$CH$_2$CO$_2$H | " | 2 | 0 | 2 | " |
| 48 | " | —CH$_2$CH$_2$CO$_2$CH$_3$ | " | 1 | 1 | 2 | " |
| 49 | " | —CH$_2$CH$_2$SO$_3$H | " | 2 | 1 | 1 | " |
| 50 | " | —CH$_2$CH$_2$CH$_3$ | " | 1.5 | 0.5 | 2 | " |
| 51 | " | —CH(CH$_3$)$_2$ | " | " | " | " | " |
| 52 | " | —CH$_2$CHCH$_3$<br>         \|<br>        OH | " | " | " | " | " |
| 53 | " | —CH$_2$CHCH$_2$OCH$_3$<br>         \|<br>        OH | " | " | " | " | " |
| 54 | " | —CH$_2$CHCH$_2$OH<br>         \|<br>        OH | " | " | " | " | " |
| 55 | " | —CH$_2$CH$_2$CH$_2$CH$_3$ | " | 1.5 | 0 | 2.5 | " |
| 56 | —N(CH$_2$)$_3$N—<br>H    H | —CH$_3$ | " | 1.5 | 0.5 | 2 | " |
| 57 | " | —CH$_2$CH$_3$ | " | " | " | " | " |
| 58 | " | —CH$_2$CH$_2$CO$_2$H | " | 1.8 | 0 | 2.2 | " |
| 59 | —N(CH$_2$)$_4$N—<br>H    H | —CH$_2$CH$_3$— | " | 1.5 | 0 | 2.5 | " |
| 60 | —N(CH$_2$)$_5$N—<br>H    H | —CH$_2$CH$_3$ | " | " | " | " | " |

TABLE-continued

Structure (VIII):

[CuPc] with substituents $(SO_2W)$, $(SO_2NH_2)_b$, $(SO_3H)_c$, where $SO_2W$ connects to a triazine ring system:

Triazine with Cl, and $-N(R)-A-Y)_a$ substituent.

| Exp. No. | —W— | —R | —A—Y | a | b | c | Shade |
|---|---|---|---|---|---|---|---|
| 61 | —N(CH₂CH₂)₂N— (piperazine) | —CH₂CH₃ | " | " | " | " | , |
| 62 | —N(H)(CH₂)₂N(H)— | —CH₂CH₃ | phenyl-SO₂CH₂CH₂OSO₃H | 1.5 | 0.5 | 2 | , |
| 63 | " | —CH₂CH₂CO₂H | " | 1.5 | 1 | 1.5 | , |
| 64 | —N(H)(CH₂)₃N(H)— | —CH₃ | " | 1.5 | 0.5 | 2 | , |
| 65 | " | —CH₂CH₃ | " | " | " | " | , |
| 66 | N(H)(CH₂)₂N(H)— | —CH₃ | 2-methyl-5-(SO₂CH₂CH₂OSO₃H)-phenyl with SO₃H | 1 | 1 | 2 | , |
| 67 | " | " | 3-OCH₃-4-methyl-phenyl-SO₂CH₂CH₂OSO₃H | " | " | , | , |
| 68 | " | " | 2-CH₃O-methyl-phenyl-SO₂CH₂CH₂OSO₃H | " | " | , | , |
| 69 | " | —CH₂CH₃ | 2-Cl-methyl-phenyl-SO₂CH₂CH₂OSO₃H | " | " | , | , |
| 70 | " | " | 2-OCH₃-methyl-phenyl-SO₂CH₂CH₂OSO₃H | " | " | , | , |
| 71 | " | " | 4-OCH₃-phenyl-SO₂CH₂CH₂OSO₃H | " | " | , | , |
| 72 | " | —CH₂CH₂CONH₂ | 6-methyl-naphthyl-SO₂CH₂CH₂OSO₃H | " | " | , | , |
| 73 | " | —CH₂CH₂Cl | naphthyl with SO₂CH₂CH₂OSO₃H, CH₃ and SO₃H | " | " | " | , |

EXAMPLE 74

Example 1 was repeated, provided that 1-N-ethylaminobenzene-4-vinylsulfone was used in an amount equimolar to 1-N-ethylaminobenzene-4-β-sulfatoethylsulfone used in Example 1, whereby a phthalocyanine compound of the following formula was obtained.

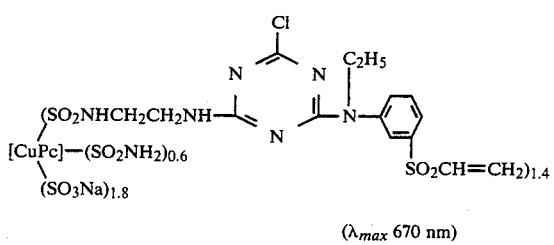

($\lambda_{max}$ 670 nm)

This compound has properties similar to that of Example 1, and is able to give a dyed or printed product of brilliant turquoise blue color having dyeing properties similar to those in Example 1, when used as a fiberreactive dye.

EXAMPLE 75

The phthalocyanine compound (50 parts) obtained in the same manner as in Example 1 was dissolved in water (500 parts), and the solution was stirred at 40° C. for 3 hours, during which the pH was controlled within a range of 9 to 10 by using a 20% aqueous sodium carbonate solution. Thereafter, the solution was cooled to 20° C., adjusted to pH 5 to 6 and then subjected to spray-drying, thereby obtaining the same phthalocyanine compound as in Example 74.

EXAMPLE 76

Example 2 was repeated, provided that nickel phthalocyanine-disulfonic acid-disulfochloride was used in an amount equimolar to copper phthalocyanine-disulfonic acid-disulfochloride used in Example 2, whereby a nickel phthalocyanine compound having the following formula was obtained.

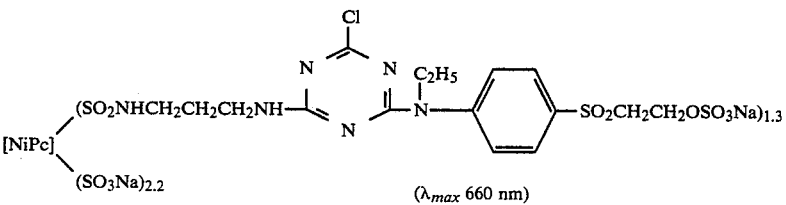

($\lambda_{max}$ 660 nm)

This compound is easily soluble in water to show a deep green color, useful as a fiber-reactive dye to give a dyed or printed product of a brilliant bluish green color excellent in light fastness, wet fastness such as washing resistance, acid-hydrolysis fastness and alkali fastness.

EXAMPLE 77

The phthalocyanine compound obtained in Example 1 (0.1, 0.3 and 0.6 part, respectively) was dissolved in water (200 parts) to obtain each dye bath. To the dye bath were added sodium sulfate (10 parts) and cotton (10 parts), and the bath was heated to 60° C. Sodium carbonate (4 parts) was added thereto, and the dyeing was continued at that temperature for 1 hour. The cotton was washed with water, soaped, again washed with water and then dried to obtain a dyed product of a brilliant turquoise blue color excellent in various fastness, particularly light fastness and wet fastness.

It was also found that the phthalocyanine compound was excellent in solubility, build-up and level dyeing properties and reproducibility of dyeings.

EXAMPLE 78

The phthalocyanine compound obtained in Example 74 (3 parts) was dissolved in water (2000 parts) to obtain a dye bath. To the bath were added sodium sulfate (200 parts) and cotton (100 parts), and the bath was heated to 50° C. 30 Minutes thereafter, sodium hydroxide (30 parts) was added to the bath, and the dyeing was continued at that temperature for 1 hour. The cotton was washed with water, soaped, again washed with water and dried to obtain a dyed product of a brilliant turquoise blue color having excellent fastness like in Example 77.

EXAMPLE 79

| Composition of color paste | |
| --- | --- |
| Compound obtained in Example 3 | 5 parts |
| Urea | 5 parts |
| Thickner, sodium alginate (5%) | 50 parts |
| Hot water | 25 parts |
| Sodium bicarbonate | 2 parts |
| Balance | 13 parts |

Mercerized cotton broad cloth was printed with the color paste having the composition described above, pre-dried, then steamed at 100° C. for 5 minutes, washed with hot water, soaped, again washed with hot water and dried.

Thus, a printed product of a brilliant turquoise blue color excellent in various fastness, particularly light fastness and wet fastness was obtained.

EXAMPLE 80

| Composition of color paste | |
| --- | --- |
| Compound obtained in Example 8 | 30 parts |
| Urea | 200 parts |
| Thickner, sodium alginate (5%) | 400 parts |
| Water | 339 parts |
| Potassium carbonate | 30 parts |
| Sodium hydroxide (30° Be') | 1 part |

Mercerized cotton broad cloth was printed with the color paste having the composition described above, pre-heated, then steamed at 100° C. for 8 minutes, washed with hot water, soaped, again washed with hot water and dried.

Thus, a printed product of a brilliant turquoise blue color excellent in various fastness, particularly light fastness and wet fastness was obtained.

What is claimed is:

1. A compound represented by a free acid of the following formula,

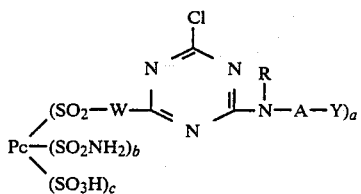

wherein Pc is a metal-free or metal-containing phthalocyanine residue, W is a group of

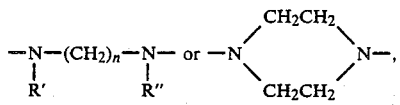

in which R' and R" are independently a hydrogen atom or a methyl or ethyl group, and n is an integer of from 2 to 6, R is an unsubstituted or substituted lower alkyl group, A is an unsubstituted or substituted phenylene or naphthylene group, Y is a group of $-SO_2CH=CH_2$ or $-SO_2CH_2CH_2Z$ in which Z is a group capable of being split by the action of an alkali, a is a positive number of from 1 to 3, and b and c are independently a positive number of from 0 to 3, provided that a, b and c satisfy $0 < a+b+c \leq 4$.

2. A compound according to claim 1, wherein Pc is a nickel or copper phthalocyanine residue and A is a phenylene group unsubstituted or substituted with one or two members selected from chlorine, bromine, methyl, ethyl, methoxy, ethoxy and sulfo, or a naphthalene group unsubstituted or substituted with one sulfo.

3. A compound according to claim 1, wherein Pc is a nickel or copper phthalocyanine residue, R is a $C_1$ to $C_4$ alkyl group unsubstituted or substituted with a hydroxyl, cyano, alkoxy, carboxy, carbamoyl, alkoxycarbonyl, alkylcarbonyloxy, sulfo or sulfamoyl group or a halogen atom, and A is a phenylene group unsubstituted or substituted with one or two members selected from chlorine, bromine, methyl, ethyl, methoxy, ethoxy and sulfo.

4. A compound represented by a free acid of the following formula,

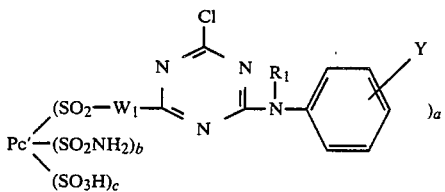

wherein Pc' is a nickel or copper phthalocyanine residue, $W_1$ is a group of $-NH-(CH_2)_n-NH-$, in which n is an integer of from 2 to 6, or

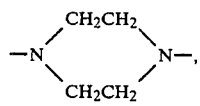

$R_1$ is a methyl, ethyl, n- or iso-propyl, 2-carboxyethyl, 2-carbamoylethyl, 2-hydroxyethyl or 2-sulfoethyl group, Y is a group of $-SO_2CH=CH_2$ or $-SO_2CH_2CH_2Z$, in which Z is a group capable of being split by the action of an alkali, a is a positive number of from 1 to 3, and b and c are independently a positive number of from 0 to 3, provided that a, b and c satisfy $0 < a+b+c \leq 4$.

5. A compound according to claim 4, wherein Y is a group of $-SO_2CH_2CH_2OSO_3H$.

6. A method for producing a phthalocyanine compound represented by a free acid of the following formula (I),

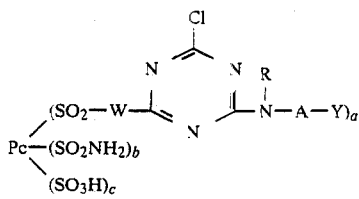

wherein Pc is a metal-free or matal-containing phthalocyanine residue, W is a group of

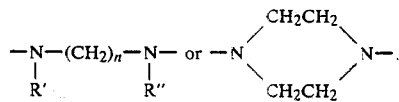

in which R' and R" are independently a hydrogen atom or a methyl or ethyl group, and n is an integer of from 2 to 6, R is an unsubstituted or substituted lower alkyl group, A is an unsubstituted or substituted phenylene or naphthylene group, Y is a group of $-SO_2CH=CH_2$ or $-SO_2CH_2CH_2Z$ in which Z is a group capable of being split by the action of an alkali, a is a positive number of from 1 to 3, and b and c are independently a positive number of from 0 to 3, provided that a, b and c satisfy $0 < a+b+c \leq 4$, which comprises (1) reacting a phthalocyanine sulfochloride with a diamine compound selected from piperazine and alkylenediamines of the following formula (II),

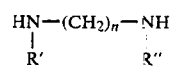

wherein R', and R" and n are as defined above, in the presence or absence of ammonia, to obtain a compound of the following formula (III),

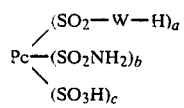

wherein Pc, W, a, b and c are as defined above, and then reacting cyanuric chloride with the compound of the formula (III) and an aromatic amine of the following formula (IV),

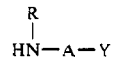

wherein R, A and Y are as defined above, in an optional order, or (2) reacting cyanuric chloride with the diamine compound as defined above and the aromatic amine of the formula (IV) in an optional order to obtain a triazine compound of the following formula (V),

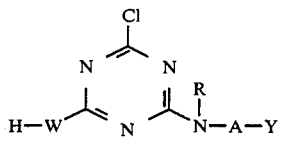

wherein W, R, A and Y are as defined above, and then reacting the triazine compound of the formula (V) with a phthalocyanine sulfochloride in the presence or absence of ammonia.

7. A method for dyeing hydroxy group or amido group containing fiber materials, which comprises contacting the fiber materials with a phthalocyanine compound represented by a free acid of the following formula,

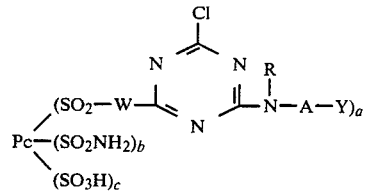

wherein Pc is a metal-free or matal-containing phthalocyanine residue, W is a group of

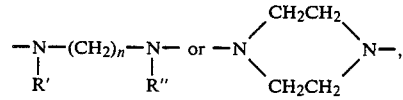

in which R' and R" are independently a hydrogen atom or a methyl or ethyl group, and N is an integer of from 2 to 6, R is an unsubstituted or substituted lower alkyl group, A is an unsubstituted or substituted phenylene or naphthylene group, Y is a group of $-SO_2CH=CH_2$ or $-SO_2CH_2CH_2Z$ in which Z is a group capable of being split by the action of an alkali, a is a positive number of from 1 to 3, and b and c are independently a positive number of from 0 to 3, provided that a, b and c satisfy $0 < a+b+c \leq 4$.

8. Hydroxy group or amido group containing fiber materials dyed by the method of claim 7.

* * * * *